United States Patent
Wakabayashi

[11] Patent Number: 5,950,033
[45] Date of Patent: *Sep. 7, 1999

[54] FILM CARTRIDGE HOLDING DEVICE

[75] Inventor: Tsutomu Wakabayashi, Kanagawa-ken, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,496

[22] Filed: Feb. 10, 1997

Related U.S. Application Data

[63] Continuation of application No. 08/502,667, Jul. 14, 1995, abandoned.

[30] Foreign Application Priority Data

Oct. 31, 1994 [JP] Japan ................................. 6-267151
Dec. 20, 1994 [JP] Japan ................................. 6-316476

[51] Int. Cl.⁶ .................................................... G03B 17/24
[52] U.S. Cl. ................................................................ 396/538
[58] Field of Search ...................................... 396/535, 538

[56] References Cited

U.S. PATENT DOCUMENTS

| | | | |
|---|---|---|---|
| 4,058,823 | 11/1977 | Mitchell et al. ........................ | 396/538 |
| 4,647,170 | 3/1987 | Stoneham ................................ | 354/275 |
| 5,177,518 | 1/1993 | Taniguchi et al. ..................... | 354/174 |
| 5,258,793 | 11/1993 | Tsuji et al. ............................. | 354/288 |
| 5,296,887 | 3/1994 | Zander . | |
| 5,402,194 | 3/1995 | Suzuki et al. .......................... | 354/288 |
| 5,404,188 | 4/1995 | Takahashi et al. ..................... | 354/21 |
| 5,418,587 | 5/1995 | DiRisio .................................. | 354/174 |
| 5,475,454 | 12/1995 | Ezawa .................................... | 354/21 |
| 5,477,295 | 12/1995 | Lawther et al. ........................ | 354/174 |

FOREIGN PATENT DOCUMENTS 4-234744  8/1992  Japan .
7-168318  7/1995  Japan .

*Primary Examiner*—David M. Gray
*Attorney, Agent, or Firm*—Oliff & Berridge, PLC

[57] ABSTRACT

A film cartridge holding device is provided which smoothly socket-connects with and precisely positions the spool shaft in a film cartridge. The film cartridge holding device has two holding shafts oppositely mounted in a film cartridge chamber. A rotatably mounted first holding shaft supports a first end of the spool shaft. The first holding shaft has a driving member which is axially slidable and biased toward the spool shaft. The driving member has a spool engagement member which angularly engages with the first end of the spool shaft. The driving member withdraws to allow the film cartridge to be loaded into the film cartridge chamber, if necessary. A second holding shaft opposite the first holding shaft supports a second end of the spool shaft and compliantly urges the spool shaft toward the first holding shaft.

28 Claims, 5 Drawing Sheets

FILM CARTRIDGE HOLDING DEVICE

This is a Continuation of application Ser. No. 08/502,667 filed Jul. 14, 1995, now abandoned.

BACKGROUND OF THE INVENTION

1. Field of the Invention

The present invention relates to a film cartridge holding device in the film cartridge chamber of a camera.

2. Description of Related Art

A common type of film cartridge used to protect camera film from light and other foreign material has a roughly cylindrical outer shell and a spool shaft extending through the center of the outer shell. The film is wound around the spool shaft and extends out of the film cartridge through a slot in the outer shell. When the film is to be exposed in a camera, the film cartridge is loaded into the camera. To help control the movement of film into and out of the film cartridge, cameras generally have a device for holding the film cartridge within the camera.

One type of mechanism for holding a film cartridge in a fixed position in a camera engages with the outer shell of the film cartridge. This mechanism prevents the outer shell from moving within the camera, but the position of the spool shaft is not controlled.

Another type of device supports the two ends of the spool shaft of the film cartridge by a pair of holding shafts, as shown in Japanese Unexamined Patent Publication Hei 4-234744. Because this mechanism directly holds the ends of the spool shaft, the spool shaft is precisely positioned. Consequently, when the spool shaft rotates to scroll the film out of the cartridge, smooth film supply results since vibration of the spool shaft and the film is suppressed. Please refer to U.S. Pat. No. 5,296,887, herein incorporated by reference.

When a pair of holding shafts are utilized to position the ends of the spool shaft, one of the holding shafts acts as the spool driving shaft. The spool driving shaft rotates the spool shaft to forward and rewind the film in the camera. The spool driving shaft has an engagement part (e.g., a key) which engages a groove formed on the spool shaft end.

However, when the film cartridge is loaded into a cartridge chamber in a camera, the engagement part on the spool driving shaft must align with the groove in the spool shaft end to allow the film cartridge to be fully inserted into the camera. Typically, the spool driving shaft is withdrawn from the cartridge chamber by a camera user when a film cartridge is inserted into the cartridge chamber. Once the film cartridge is fully inserted into the cartridge chamber, the user rotates the spool driving shaft while forcing the spool driving shaft into the cartridge chamber. Rotating the spool driving shaft aligns the key on the spool driving shaft with the groove in the spool shaft end. When the key and groove are aligned, the spool driving shaft can be fully inserted into the cartridge chamber.

However, because the position of the spool shaft is not precisely controlled when the spool driving shaft is inserted into the cartridge chamber, the spool driving shaft and the other holding shaft do not always smoothly socket-connect with the ends of the spool shaft. In addition, play in the spool driving shaft increases the amount of backlash in the spool drive mechanism, which prevents precise positioning of the spool shaft.

SUMMARY OF THE INVENTION

Therefore, the invention provides a film cartridge holding device which smoothly socket-connects with the spool shaft in a film cartridge and precisely positions the spool shaft in the cartridge chamber. The film cartridge holding device also eliminates the need to withdraw the spool driving shaft from the film cartridge chamber to allow the film cartridge to be inserted into the cartridge chamber.

The invention holds the spool shaft of a film cartridge inserted into the cartridge chamber between a first holding shaft and a second holding shaft. The first and second holding shafts socket-connect with each end of the spool shaft. The first holding shaft has a spool shaft holding member which supports the spool shaft and regulates the position of a first end of the spool shaft. A driving member, which is axially slidable relative to the spool shaft holding member, has a spool engagement member which engages with a groove in the end of the spool shaft. When the spool engagement member engages the groove in the spool shaft, the driving member, the spool shaft holding member and the spool shaft are rotatably engaged with each other. The driving member is urged toward the spool shaft by an energizing member.

The second holding shaft is disposed in the cartridge chamber opposite the first holding shaft. The second holding shaft urges the spool shaft toward the first holding shaft and regulates the position of a second end of the spool shaft.

When the film cartridge is loaded into the cartridge chamber, the spool engagement member on the driving member need not be aligned with the groove in the first end of the spool shaft. If the spool engagement member and the groove are not aligned, the spool engagement member and the driving member withdraw. This withdrawal allows the film cartridge to be fully inserted into the cartridge chamber and the first and second holding shafts to socket-connect with the ends of the spool shaft. Consequently, the film cartridge can be loaded into the cartridge chamber without hindrance even if the spool engagement member does not engage with the spool shaft. The spool engagement member engages the groove in the spool shaft when the first holding shaft is rotated and the spool engagement member aligns with the groove. Therefore, since the first holding shaft is not moved in the axial direction to allow the film cartridge to be loaded, the position of the spool shaft in the cartridge chamber can be precisely controlled.

DETAILED DESCRIPTION OF THE PREFERRED EMBODIMENT

Figure 1:
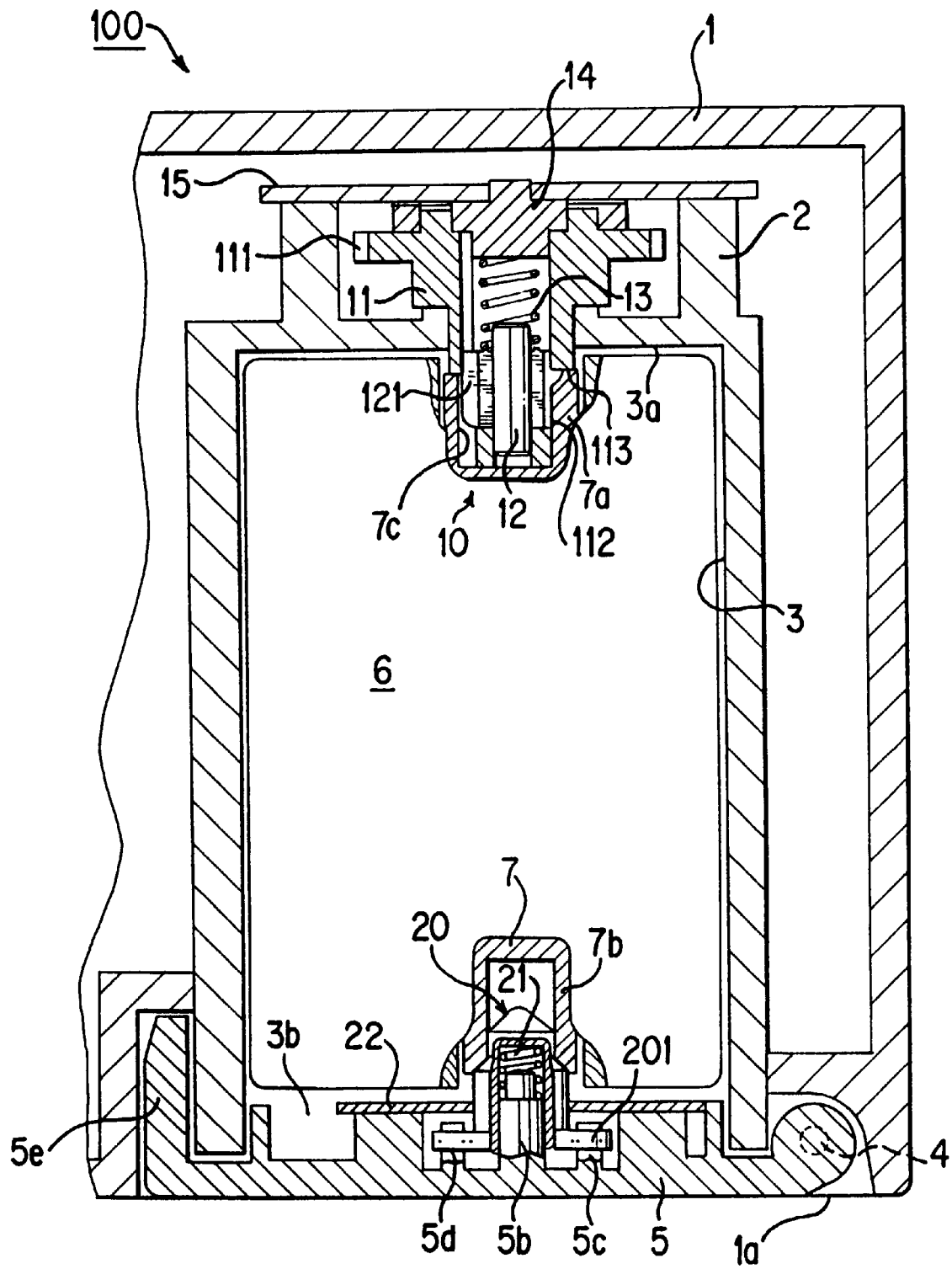
FIG. 1 is a cross-sectional view of an embodiment of the invention wherein the spool engagement member is aligned with the groove in the spool shaft end.

FIG. 1 shows a cross-sectional view of a camera 100 in an embodiment of the invention. A camera cover 1 defines an external appearance of the camera 100 and encloses a camera body 2. A cartridge chamber 3 formed in the camera body 2 receives a film cartridge 6. A second side 3b of the cartridge chamber 3 is opened and closed by of a cartridge chamber cover 5 which rotates around a hinge shaft 4 fixed to a surface 1a of the camera cover 1. FIG. 1 shows the cartridge chamber cover 5 in a closed position.

To insert the film cartridge 6 into the cartridge chamber 3, the cartridge chamber cover 5 is rotated around the hinge shaft 4 to an open position. After the film cartridge 6 is inserted into the cartridge chamber 3, the cartridge chamber cover 5 is rotated to the closed position to trap the film cartridge 6 in the cartridge chamber 3. The cartridge chamber cover 5 locks in the closed position when the key unit 5e engages with an engagement stop (not shown) mounted between the camera body 2 and the camera cover 1.

When the film cartridge 6 is inserted into the cartridge chamber 3 and the cartridge chamber cover 5 is closed, a spool shaft 7 in the film cartridge 6 is supported by a first holding shaft 10 and a second holding shaft 20. The first holding shaft 10 is mounted to the camera body 2 at a first end 3a of the cartridge chamber 3. The second holding shaft 20 is mounted to the cartridge chamber cover 5 at the second side 3b of the cartridge chamber 3. When the cartridge chamber cover 5 is closed following the insertion of the film cartridge 6, a first and second spool shaft end 7a and 7b of the spool shaft 7 socket-connect with the first and second holding shafts 10 and 20, respectively. That is, portions of the first and second holding shafts 10 and 20 partially insert into the first and second spool shaft ends 7a and 7b of the spool shaft 7.

The first holding shaft 10 has a spool shaft holding member 11 which is rotatably mounted to the camera body 2. A socket-connecting portion 112 of the spool shaft holding member 11 extends into the cartridge chamber 3 and partially inserts into the first spool shaft end 7a. A step surface 113 on the spool shaft holding member 11 contacts the first spool shaft end 7a and determines an axial position of the spool shaft 7.

A driving member 12 disposed in a cavity formed in the spool shaft holding member 11 moves axially relative to the spool shaft holding member 11. The driving member 12 has a spool engagement member 121 which extends radially outward and couples with a groove 7c formed in the first spool shaft end 7a. An energizing member 13 (e.g. a coil spring) also disposed within the cavity is formed of an elastic material. The energizing member 13 contacts a rotation cover 14 fixed to the spool shaft holding member 11 and urges the driving member 12 toward the spool shaft 7. A base plate 15, fixed to the camera body 2, supports the rotation cover 14 and prevents the spool shaft holding member 11 from wobbling during rotation.

A gear 111 formed around an outer periphery of the spool shaft holding member 11 engages with a drive motor (not shown). The drive motor drives the spool shaft holding member 11 in a rotary direction through the gear 111. The gear 111 could be replaced with any other means for driving the spool shaft holding member 11. For example, the gear 111 could be replaced by a belt drive system.

The second holding shaft 20 is mounted over a shaft 5b formed in the cartridge chamber cover 5. A pressing member 21, such as a coil spring or other elastically deformable member, is disposed between the shaft 5b and the second holding shaft 20. The pressing member 21 urges the second holding shaft 20 away from the cartridge chamber cover 5. Thus, when the cartridge chamber cover 5 is closed to trap the film cartridge 6 in the cartridge chamber 3, a portion of the second holding shaft 20 partially inserts into the second spool shaft end 7b. The second holding shaft 20 forces the spool shaft 7 toward the first holding shaft 10 under the force of the pressing member 21. The second holding shaft 20 pushes the spool shaft 7 toward the first holding shaft 10 until the first spool shaft end 7a contacts the step portion 113 of the spool shaft holding member 11.

A flange 201 formed on the second holding shaft 20 engages with engagement stops 5c and 5d formed in the cartridge chamber cover 5 and prevents the second holding shaft 20 from rotating around a center axis of the shaft 5b. The flange 201 also contacts a base plate 22 which resists the biasing force of the pressing member 21 on the second holding shaft 20 when the cartridge chamber cover 5 is open.

Figure 2:
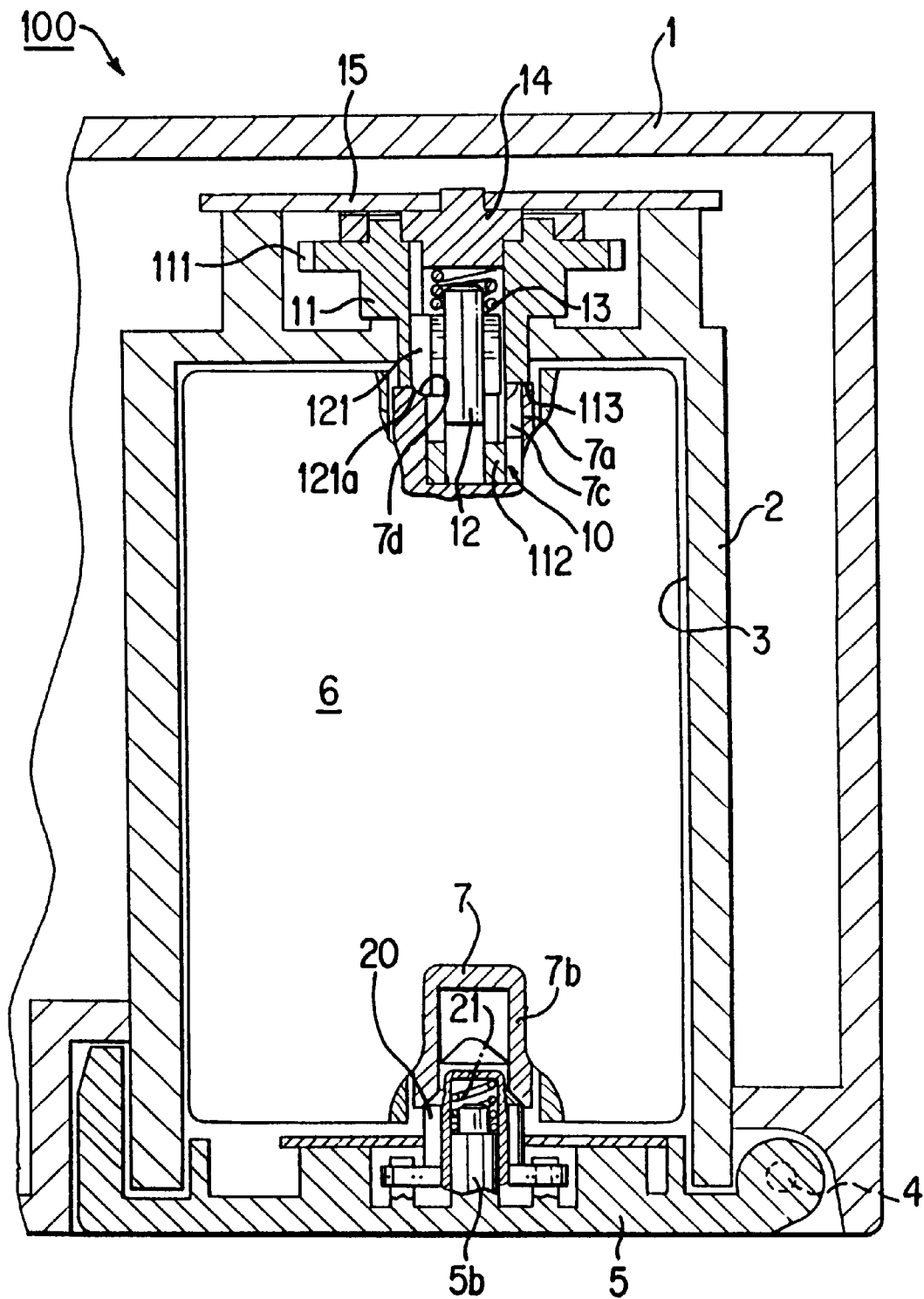
FIG. 2 is a cross-sectional view wherein the spool engagement member is not aligned with the groove in the spool shaft end.

FIG. 1 shows the condition where the spool engagement member 121 on the driving member 12 aligns and couples with the groove 7c in the first spool shaft end 7a. FIG. 2 shows the condition where the spool engagement member 121 does not align with the groove 7c when the film cartridge 6 is inserted into the cartridge chamber 3. Since the spool engagement member 121 and the groove 7c do not align, a tapered surface 7d of the first spool shaft end 7a contacts a chamfer surface 121a on the spool engagement member 121. Thus, the force of the second holding shaft 20 on the spool shaft 7 is transferred to the-spool engagement member 121.

In response to the force of the spool shaft 7 on the chamfer surface 121a, the driving member 12 withdraws axially away from the socket-connecting portion 112. The driving member 12 withdraws because the force exerted on the spool shaft 7 by the second holding shaft 20 is larger than the force exerted by the energizing member 13 on the driving member 12. The driving member 12 withdraws axially until the first spool shaft end 7a contacts the step portion 113 on the spool shaft holding member 11. Preferably, the force of the second holding shaft 20 (i.e., the pressing member 21) is approximately twice that of the energizing member 13. In this embodiment of the invention, the difference in force exerted by the pressing member 21 and the energizing member 13 is 50 gf (approximately 0.49 N)

To align the spool engagement member 121 with the groove 7c in the first spool shaft end 7a, the drive motor rotates the spool shaft holding member 11 and the driving member 12. When the spool engagement member 121 is aligned with the groove 7c, the spool engagement member 121 slides into the groove 7c under the force of the energizing member 13.

Figure 3:
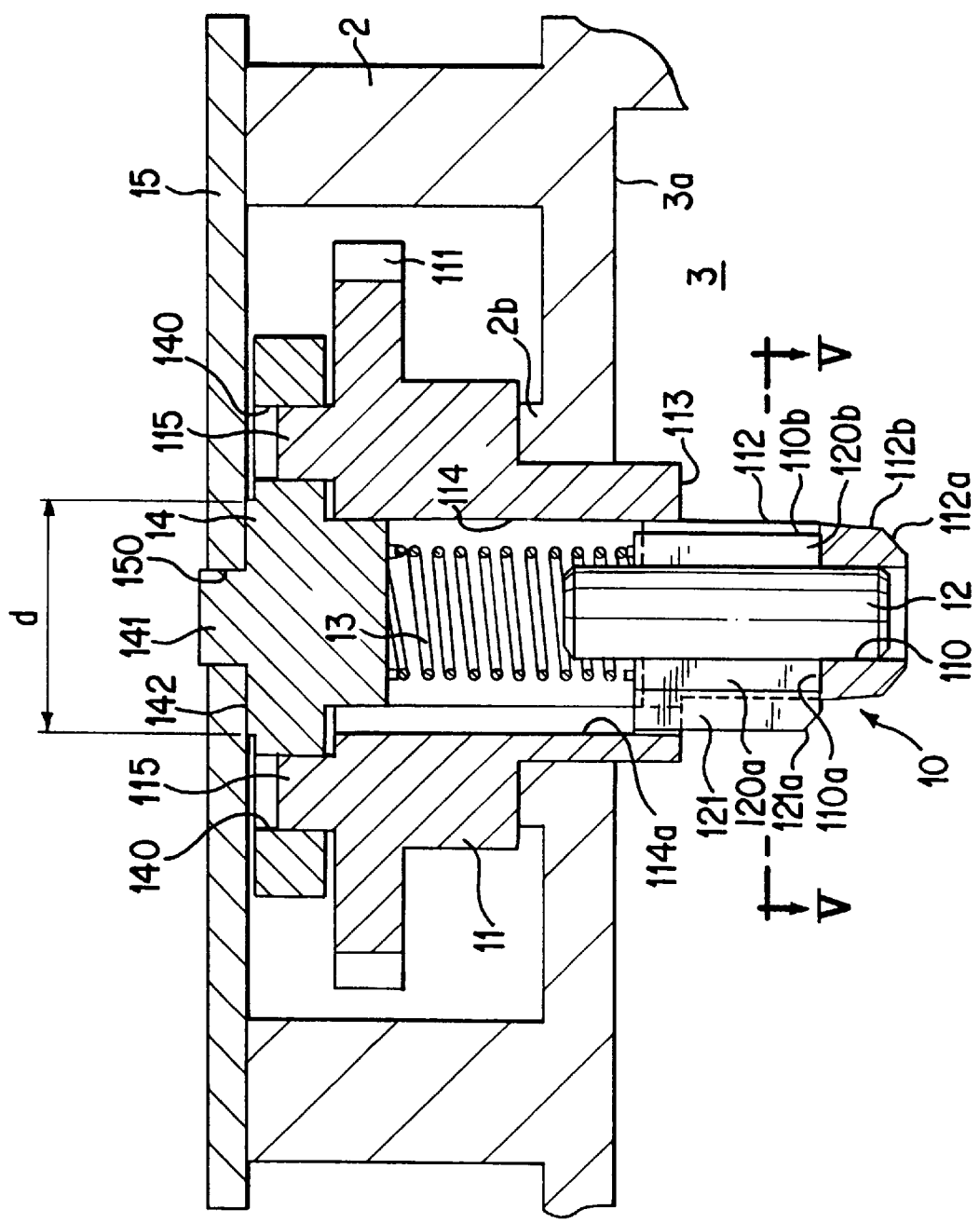
FIG. 3 is cross-sectional view of the first holding shaft.

FIG. 3 shows the first holding shaft 10 in detail. The socket-connecting portion 112 of the spool shaft holding member 11 has a two-step tapered surface 112a and 112b. The two-step tapered surface 112a and 112b facilitates smooth socket-connection of the socket-connecting portion 112 with the first spool shaft end 7a. Thus, the film cartridge 6 and the spool shaft 7 need not be perfectly aligned with the first holding shaft 10 when inserted into the cartridge chamber 3. The two-step tapered surface 112a and 112b compensates for minor misalignment between the first spool shaft end 7a and the socket-connecting portion 112.

A guide hole 110 formed in the socket-connecting portion 112 receives the driving member 12 and communicates with an escape hole 114 formed in the spool shaft holding member 11. The guide hole 110 is symmetric around an axis of rotation of the spool shaft holding member 11. A pair of key slots 110a and 110b formed in the socket-connecting portion 112 provides communication between the guide hole 110 and an outer surface of the socket-connecting portion 112. The key slots 110a and 110b receive keys 120a and 120b extending radially outward from the driving member 12. The key slots 110a and 110b and the keys 120a and 120b rotationally couple the driving member 12 and the spool shaft holding member 11 while still allowing the driving member 12 to move axially within the spool shaft holding member 11. In addition, the keys 120a and 120b contact lower surfaces of the key slots 110a and 110b to prevent the driving member 12 from moving axially out of the guide hole 110.

The escape hole 114 in the spool shaft holding member 11 is coaxial with the guide hole 110. The escape hole 114 is also large enough in diameter to receive the driving member 12 and the keys 120a and 120b when the driving member 12 withdraws as described above. An escape hole groove 114a formed at the periphery of the escape hole 114 receives the spool engagement member 121 when the driving member 12 withdraws. The escape hole groove 114a extends from the step portion 113 to the rotation cover 14. The escape hole groove 114a helps ensure the driving member 12 does not rotate relative to the spool shaft holding member 11 when the driving member 12 withdraws.

The energizing member 13 is contained in the escape hole 114 and contacts both the rotation cover 14 and the driving member 12. Socket holes 140 formed in the rotation cover 14 engage pins 115 on the spool shaft holding member 11, so that the rotation cover 14 rotates integrally with the spool shaft holding member 11. Preferably, caulk is applied to the pins 115 to couple the rotation cover 14 and the spool shaft holding member 11 in an axial direction. However, various other coupling means may be used, such as bolts, adhesion, deposition or the like.

When the rotation cover 14 is fixed to the spool shaft holding member 11, the rotation cover presses against the energizing member 13, thus pre-loading the energizing member 13. The energizing member 13 is compressed by the rotation cover 14 so the driving member 12 is forced toward the socket-connecting portion 112 of the spool shaft holding member 11. Since the energizing member 13, the driving member 12 and the rotation cover 14 rotate integrally with each other, noise and friction caused by rubbing of these parts (e.g., squeaking of a coil spring as the energizing member 13) are not generated.

A rotation shaft 141 is provided at a center of a top edge of the rotation cover 14. The rotation shaft 141 cooperates with a hole 150 in the base plate 15 to regulate a position of the spool shaft holding member 11 and to prevent wobbling of the first holding shaft 10. The base plate 15 is connected to the camera body 2 by means of a coupling member (not shown), for example a screw.

The rotation cover 14 and the spool shaft holding member 11 are disposed between the base plate 15 and a protrusion 2b on the camera body 2, so that play in the axial direction is minimized. Accordingly, the socket-connecting portion 112 and the step portion 113 always extend into the cartridge chamber 3. To suppress noise and friction caused by rubbing between the rotation cover 14 and the base plate 15, an area of contact 142 between the two components is minimized. That is, the diameter d of the area of contact 142 between the rotation cover 14 and the base plate 15 is kept as small as possible.

Friction between the rotating cover 14 and the base plate 15 is also reduced since the restoring force of the energizing member 13 acts on the driving member 12 and the rotation cover 14 in opposite directions. That is, these forces are completely contained within the first holding shaft 10. Consequently, the force of the energizing member 13 is not transferred from the rotation cover 14 to the base plate 15, reducing the friction which would otherwise be present between the rotation cover 14 and the base plate 15.

Figure 4:
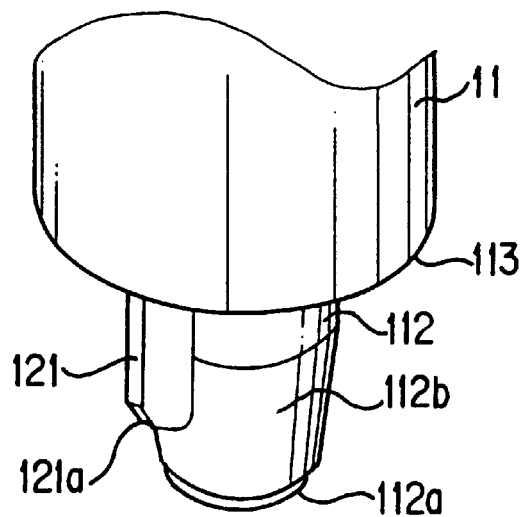
FIG. 4 is an oblique view of a spool shaft end of the first holding shaft.

FIG. 4 shows an oblique view of the socket-connecting portion 112 of the spool shaft holding member 11. The spool engagement member 121 is shown extending radially outward from the socket-connecting portion 112.

Figure 5:
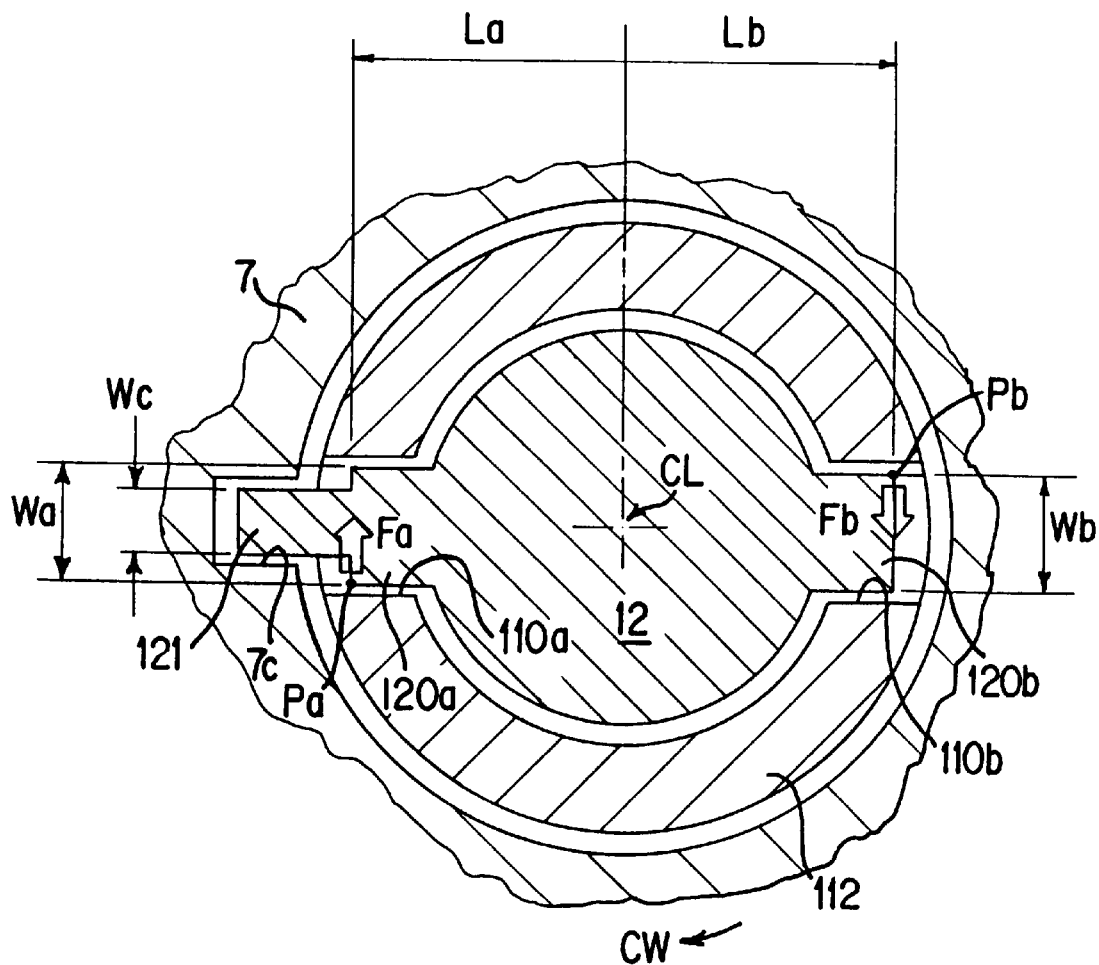
FIG. 5 is a cross-sectional view taken along a line V—V shown in FIG. 3.

FIG. 5 shows a view of the first holding shaft 10 along the line V—V shown in FIG. 3. The key slots 110a and 110b and the keys 120a and 120b are symmetric around an axis of rotation CL of the first holding shaft 10. Consequently, the distances La and Lb from the axis of rotation CL and the widths Wa and Wb of the right and left keys 120a and 120b are equal. Note, however that the width Wc of the spool engagement member 121 is smaller than the width Wa of the key 120a. Since La=Lb and Wa=Wb, the keys 120a and 120b and key slots 110a and 110b always engage at symmetric positions relative to the axis of rotation CL when the first holding shaft 10 is rotated. This prevents eccentricity of the driving member 12 since the forces acting on the driving member 12 are radially balanced.

For example, when the spool shaft holding member 11 rotates in a clockwise direction CW, the positions Pa and Pb on the keys 120a and 120b engage with surfaces defining the key slots 110a and 110b. As a result, forces Fa and Fb act on the driving member 12, creating a moment that rotates the driving member 12 about the axis of rotation CL. No force causing displacement of the driving member 12 in the radial direction is created.

It should be noted that the spacing between the spool shaft holding member 11, the driving member 12 and the spool shaft 7 shown in FIG. 5 is larger than the actual spacing. Preferably, spacing between the components is within a predetermined tolerance range so effective coupling is achieved.

Figure 6:
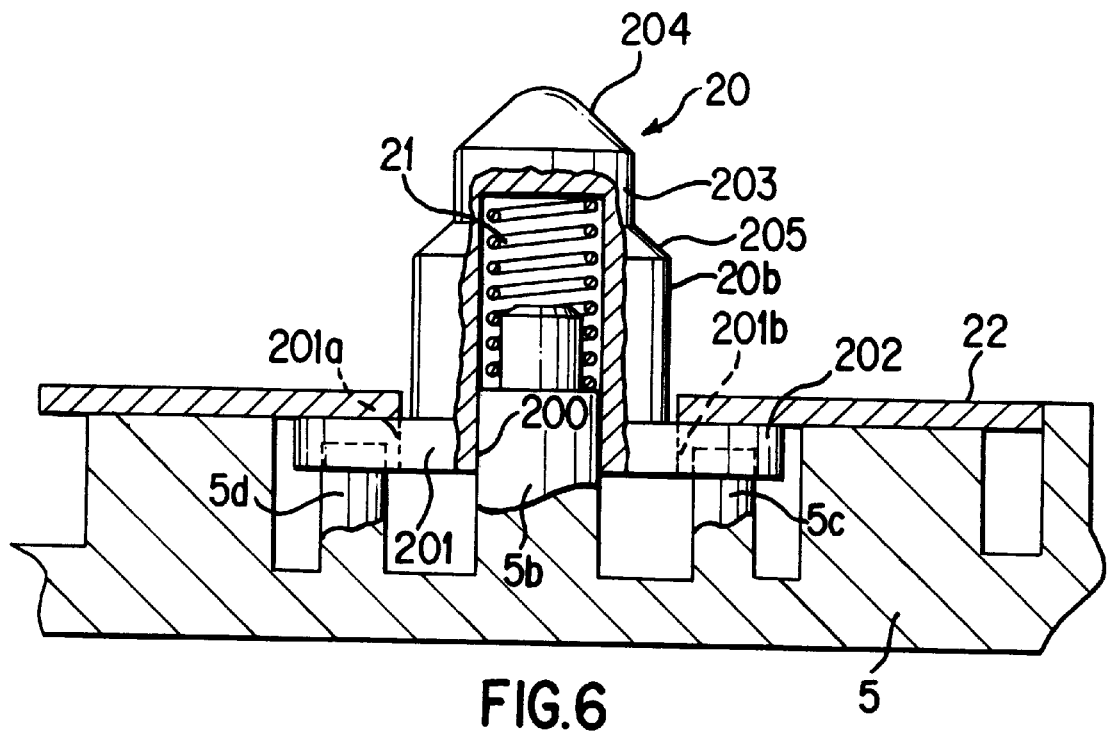
FIG. 6 is a cross-sectional view of the second holding shaft.

FIG. 6 shows the second holding shaft 20 in detail. A center axis of the shaft 5b matches the axis of rotation CL of the first holding shaft 10 when the cartridge chamber cover 5 is closed. This ensures that the spool shaft 7 is properly positioned in the cartridge chamber 3. The shaft 5b partially inserts into a socket hole 200 formed in the second holding shaft 20. The socket hole 200 has a diameter larger than a diameter of the shaft 5b. Therefore, the second holding shaft 20 can move axially relative to the shaft 5b.

The second holding shaft 20 has a socket-connecting portion 203 which partially inserts into the second spool shaft end 7b when the film cartridge 6 is contained in the cartridge chamber 3. The socket-connecting portion 203 has a first tapered surface 204, preferably formed in a spherical shape. A second tapered surface 205 (also called linkage component) is also formed on the socket-connecting portion 203 and portion 206 so as to link socket-connecting portion 203 and portion 206.

When the film cartridge 6 is loaded into the cartridge chamber 3, the second spool shaft end 7b need not be perfectly aligned with the socket-connecting portion 203. The first and second tapered surfaces 204 and 205 compensate for misalignment and ensure the second holding shaft 20 and the second spool shaft end 7b accurately socket-connect. When socket-connected, the second tapered surface 205 contacts a tapered surface on the second spool shaft end 7b similar to the tapered surface 7d on the first spool shaft end 7a.

The pressing member 21 is disposed within the socket hole 200 and contacts the second holding shaft 20 and the shaft 5b. The second holding shaft 20 is forced away from the cartridge chamber cover 5 by the pressing member 21. The flange 201 contacts the base plate 22 which resists the force of the pressing member 21 on the second holding shaft 20. The base plate 22 thus assures the second holding shaft 20 does not separate from the cartridge chamber cover 5 when the cartridge chamber cover 5 is open. The base plate 22 is fixed to the cartridge chamber cover 5 by a coupling device (not shown), such as a screw.

Notch grooves 201a and 201b formed in the flange 201 engage with engagement stop shafts 5c and 5d formed on the cartridge chamber cover 5. The engagement stop shafts 5c and 5d prevent the second holding shaft 20 from rotating around the center axis of the shaft 5b. Since the pressing member 21, the second holding shaft 20 and the shaft 5b do not rotate, friction and noise created by rubbing of these components during rotation (e.g., squeaking of a coil spring as the pressing member 21) are not generated.

Figure 7:
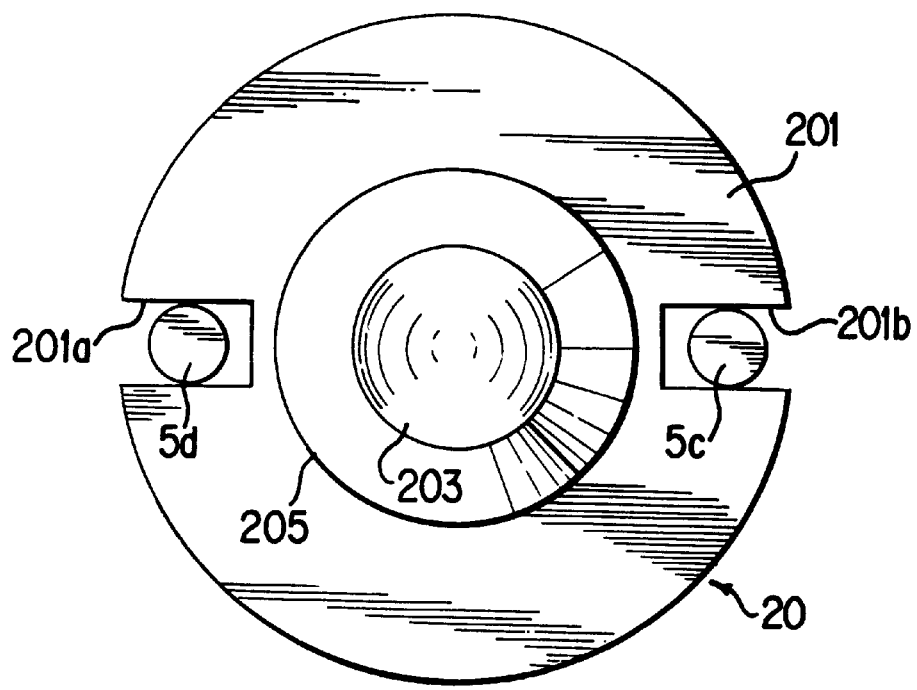
FIG. 7 is a top view the second holding shaft.

FIG. 7 shows a top view of the second holding shaft 20. The notch grooves 201a and 201b are shown engaging the engagement stop shafts 5c and 5d. When the first holding shaft 10 rotates the spool shaft 7, the second tapered surface 205 of the second holding shaft 20 contacts the spool shaft 7 which rotates around the second holding shaft 20. The second tapered surface 205 prevents eccentricity and reduces vibration in the spool shaft 7 during rotation, since the second tapered surface 205 causes the spool shaft 7 to self-align with the center axis of the shaft 5b and thus the axis of rotation CL of the first holding shaft 10.

The second holding shaft 20 could be made to rotate, but such a configuration increases the number of components needed and the complexity of the second holding shaft 20. The second holding shaft 20 in the preferred embodiment of the invention is light in weight, which decreases the force necessary to open, close and lock the cartridge chamber cover 5. However, if a particular application required the second holding shaft 20 to rotate, such a design is possible as will be appreciated by one skilled in the art.

In the preferred embodiment, the spool shaft holding member 11 and the driving member 12 rotate together, but other configurations are possible. The spool shaft holding member 11 could be made fixed with only the driving member 12 being rotated by the drive motor.

In addition, the invention is not limited to the cartridge chamber 3 of a camera 100, but can also be applied to various types of devices that hold both ends of a spool shaft in a film cartridge. Therefore, the invention is not limited to the embodiments described herein. The invention is intended to cover all alternatives, modifications and equivalents that may be included within the spirit and scope of the invention as defined by the appended claims.

What is claimed is:

1. A film cartridge holding device, comprising:
    a cartridge chamber shaped to receive a film cartridge having a spool shaft, the cartridge chamber having a first side opposite a second side;
    a first holding shaft mounted to the first side of the cartridge chamber, the first holding shaft comprising:
        a spool shaft holding member having a spool shaft end extending toward the second side of the cartridge chamber and a spool shaft positioning surface, the spool shaft holding member having a cavity and at least one opening extending radially from the cavity to an outer surface of the spool shaft holding member,
        a driving member positioned within the cavity, rotatable around an axis of the first holding shafts, and capable of moving axially within the cavity relative to the spool shaft holding member, the driving member having a spool engagement member extending radially outward from the driving member through the at least one opening beyond the outer surface of the spool shaft holding member, and
        an energizing member axially urging the driving member toward the spool shaft end of the spool shaft holding member.

2. The film cartridge holding device of claim 1, wherein the spool shaft holding member is rotatable around the axis of the first holding shaft.

3. The film cartridge holding device of claim 1, wherein the energizing member is formed of an elastic material.

4. The film cartridge holding device of claim 1, wherein the first holding shaft further comprises a rotating cover fixed to the spool shaft holding member on a side opposite the spool shaft end.

5. The film cartridge holding device of claim 4, wherein the energizing member and the driving member are disposed within the cavity formed in the spool shaft holding member, the energizing member disposed between the rotating cover and the driving member.

6. The film cartridge holding device of claim 1, wherein the first holding shaft further comprises a rotation transfer element which causes the driving member to rotate when driven by a drive element.

7. The film cartridge holding device of claim 1, wherein the spool shaft holding member has two openings formed on radially opposite sides of the outer surface of the spool shaft holding member, the openings communicating with the cavity formed in the spool shaft holding member, and
    the driving member having two intermediate engagement members extending radially outward on opposite sides of the driving member, each intermediate engagement member extending into a corresponding opening in the spool shaft holding member.

8. The film cartridge holding device of claim 7, wherein the spool engagement member extends radially outward from at least one of the intermediate engagement members beyond the outer surface of the spool shaft holding member.

9. The film cartridge holding device of claim 1, wherein the spool shaft holding member has a plurality of openings formed in radially symmetric positions in the outer surface of the spool shaft holding member symmetrically in relation to the axis of said spool shaft holding member, the plurality of openings communicating with the cavity formed in the spool shaft holding member, and
    the driving member having a plurality of intermediate engagement members extending radially outward on opposite sides of the driving member and extending outward symmetrically in relation to a center of rotation of said spool shaft holding member, each of the plurality of intermediate engagement members extending into a corresponding opening in the spool shaft holding member.

10. The film cartridge holding device of claim 9, wherein the spool engagement member extends radially outward from at least one of the intermediate engagement members beyond the outer surface of the spool shaft holding member.

11. The film cartridge holding device of claim 1, further comprising a second holding shaft mounted to the second side of the cartridge chamber.

12. The film cartridge holding device of claim 11, wherein the second holding shaft does not rotate around an axis of the second holding shaft.

13. The film cartridge holding device of claim 11, wherein a pressing member urges the second holding shaft toward the first side of the cartridge chamber.

14. The film cartridge holding device of claim 11, wherein a plane of contact between the second holding shaft and the spool shaft in the film cartridge is a conical frustum.

15. The film cartridge holding device of claim 11, wherein at least a portion of the second side of the cartridge chamber comprises a cartridge chamber cover swingably mounted to the cartridge chamber, the cartridge chamber cover moving between an open position and a closed position.

16. A film cartridge holding device, comprising:
cartridge chamber means for receiving spool means, the cartridge chamber means having a first side opposite a second side;
first holding means for supporting and driving the spool means, the first holding means mounted to the first side of the cartridge chamber means and comprising:
spool support means for supporting and positioning the spool means, the spool support means having a first end adjacent the first side with a first outer diameter and a second opposite end extending toward the second side of the cartridge chamber means, the second end having a second outer diameter less than the first outer diameter, and
driving means for engaging with and rotatably driving the spool means, the driving means capable of moving axially between the first and second ends, said driving means comprising at least one engagement means which extends radially beyond the second outer diameter of the spool support means; and
energizing means for axially urging the driving means toward the second side of the cartridge chamber means.

17. The film cartridge holding device of claim 16, wherein the spool support means rotates around an axis of the first holding means.

18. The film cartridge holding device of claim 16, wherein the energizing means is formed of an elastic material.

19. The film cartridge holding device of claim 16, wherein the first holding means further comprises cover means fixed to the spool support means on a side opposite the second side of the cartridge chamber means.

20. The film cartridge holding device of claim 19, wherein the energizing means and the driving means are disposed within the spool support means, the energizing means disposed between the cover means and the driving means.

21. The film cartridge holding device of claim 16, wherein the first holding means further comprises rotation means which rotates the driving means.

22. The film cartridge holding device of claim 16, wherein the spool support means has a plurality of openings formed in the spool support means, the openings communicating with a cavity formed in the spool support means, and
the driving means is disposed within the cavity, the driving means comprising a plurality of intermediate engagement means, each extending radially outward into a corresponding one of the plurality of opening.

23. The film cartridge holding device of claim 22, wherein said at least one engagement means extends radially outward from at least one of the plurality of intermediate engagement means.

24. The film cartridge holding device of claim 16, further comprising a second holding means for supporting and positioning the spool means and mounted to the second side of the cartridge chamber means.

25. The film cartridge holding device of claim 24, wherein the second holding means does not rotate around an axis of the second holding means.

26. The film cartridge holding device of claim 24, wherein pressing means urges the second holding means toward the first side of the cartridge chamber means.

27. The film cartridge holding device of claim 24, wherein a plane of contact between the second holding means and the spool means is a conical frustum.

28. The film cartridge holding device of claim 24, wherein the second side of the cartridge chamber means comprises a cover means for opening and closing the cartridge chamber means.

* * * * *